(12) United States Patent
Stell et al.

(10) Patent No.: US 9,937,906 B1
(45) Date of Patent: Apr. 10, 2018

(54) VEHICLE GARAGE WARNING SYSTEM

(71) Applicants: Thomas J Stell, Rockwell City, IA (US); Aaron C Stell, Knightdale, NV (US)

(72) Inventors: Thomas J Stell, Rockwell City, IA (US); Aaron C Stell, Knightdale, NV (US)

( * ) Notice: Subject to any disclaimer, the term of this patent is extended or adjusted under 35 U.S.C. 154(b) by 0 days.

(21) Appl. No.: 15/349,557

(22) Filed: Nov. 11, 2016

(51) Int. Cl.
*B60T 7/00* (2006.01)
*B60T 7/22* (2006.01)
*E05F 15/73* (2015.01)
*B60T 3/00* (2006.01)
*B60W 50/14* (2012.01)

(52) U.S. Cl.
CPC ............... *B60T 7/22* (2013.01); *B60T 3/00* (2013.01); *B60W 50/14* (2013.01); *E05F 15/73* (2015.01); *B60W 2050/143* (2013.01); *B60W 2050/146* (2013.01)

(58) Field of Classification Search
CPC .. B60T 7/22; B60T 3/00; E05F 15/73; B60W 50/14; B60W 2050/143; B60W 2050/146
USPC ......... 701/70, 301, 408; 340/5.71, 435, 436, 340/932.2
See application file for complete search history.

(56) References Cited

U.S. PATENT DOCUMENTS

| | | | | |
|---|---|---|---|---|
| 6,154,150 A * | 11/2000 | Laubach | ............... | E04H 6/426 340/309.16 |
| 6,163,253 A | 12/2000 | Yaron et al. | | |
| 6,559,775 B1 * | 5/2003 | King | ............... | E05F 15/40 340/10.1 |
| 6,879,122 B1 * | 4/2005 | Stewart | ............... | E05F 15/668 318/280 |
| 8,696,272 B1 * | 4/2014 | Ragland | ............... | B60P 3/077 410/19 |
| 2003/0102836 A1 * | 6/2003 | McCall | ............... | E05F 15/668 318/445 |
| 2007/0013531 A1 | 1/2007 | Hules et al. | | |
| 2007/0120707 A1 * | 5/2007 | Donnelly | ............... | B60Q 9/002 340/933 |
| 2007/0251231 A1 * | 11/2007 | Arnold | ............... | B60T 7/042 60/545 |
| 2009/0289813 A1 * | 11/2009 | Kwiecinski | ............ | B60Q 9/006 340/932.2 |
| 2010/0245127 A1 * | 9/2010 | Hong | ............... | B60Q 9/006 340/932.2 |
| 2010/0272916 A1 * | 10/2010 | Falbaum | ............... | B60S 3/04 427/427.2 |
| 2011/0196568 A1 * | 8/2011 | Nickolaou | ........ | B60W 30/0953 701/31.4 |
| 2015/0084779 A1 * | 3/2015 | Saladin | ............. | G07C 9/00896 340/686.6 |
| 2015/0302737 A1 * | 10/2015 | Geerlings | ............. | G08C 17/02 340/5.25 |
| 2016/0311429 A1 * | 10/2016 | Holland-Letz | ..... | B62D 15/0285 |
| 2017/0154482 A1 * | 6/2017 | Osborne | ............ | G07C 9/00309 |

* cited by examiner

Primary Examiner — Marthe Y Marc-Coleman
(74) Attorney, Agent, or Firm — James G. Passé; Passé Intellectual Property, LLC

(57) ABSTRACT

The present invention relates to a system and method of detecting if a garage door is open, in order to prevent a vehicle which is leaving the garage from hitting the door or approaching the door before it is sufficiently open enough for the exiting vehicle to clear the door.

18 Claims, 4 Drawing Sheets

VEHICLE GARAGE WARNING SYSTEM

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates a device and method warning a user that the garage door is not open when a user operating a vehicle is leaving a garage. In particular, it relates to a sensor system for initiating an alarm when a user in a vehicle moves the vehicle toward the garage door and the garage door is not open, or at least sufficiently open.

Description of Related Art

One of the big problems when parking a vehicle, such as a car, in the garage is that one must pull sufficiently into the garage to prevent the garage door from hitting the vehicle. There are a myriad of devices, both static and electronic, for determining the position of the vehicle during the parking process in a garage. These devices include everything from a simple ball on a string to electronic devices that measure the vehicle position (such as depicted in U.S. Pat. No. 6,154,150), such as those which utilize infrared beams or ultrasonic beams positioned to be broken or measure car position upon movement of the vehicle towards a favored parking position.

While these devices work fairly well, an additional problem occurs when a user is backing out or otherwise exiting the garage. It is obvious that the garage door must be opened before a driver can exit the vehicle from the garage. The truth is, however, hundreds if not thousands of times a day drivers back a vehicle into the closed garage door while the garage door is in the process of opening. While it is very easy to see the garage door, a number of things can distract the driver from noticing the state of the garage door during leaving. This is also complicated by the fact that most drivers pull their vehicle into a garage, meaning they are backing out when they leave and might not be looking at the garage door. To date, there are no solutions to determine when it is safe to exit the garage.

BRIEF SUMMARY OF THE INVENTION

The present invention relates to a system and method for alerting a driver that the garage door is not open, or at least not sufficiently open, as the driver begins pulling out of the garage. In one embodiment, the invention is combined with a device to aid the driver in parking the car in the garage.

Accordingly, in one embodiment, there is a system for alerting a driver of a vehicle exiting a garage that a garage door is not sufficiently open to allow exit of the vehicle comprising:
  a) an electronic sensor for determining when the vehicle is moving;
  b) an electronic sensor for determining if the garage door is sufficiently open for the vehicle to exit without hitting the garage door;
  c) an alarm to notify the vehicle's driver when the garage door is insufficiently open to allow for the vehicle to exit; and
  d) a microcontroller to control the operation of the sensors and alarm.

In yet another embodiment, there is a method for notifying a driver of a vehicle exiting a garage that a garage door is not sufficiently open to allow the vehicle to exit without hitting the garage door comprising:
  a) sensing if the vehicle is moving toward the garage door;
  b) sensing if the garage door is sufficiently open for the vehicle to exit the garage without hitting the garage door: and
  c) initiating an alarm to warn the vehicle's driver when the garage door is not sufficiently open for the vehicle to not hit the door when the driver is moving the vehicle toward the garage door.

DETAILED DESCRIPTION OF THE INVENTION

Figure 1:
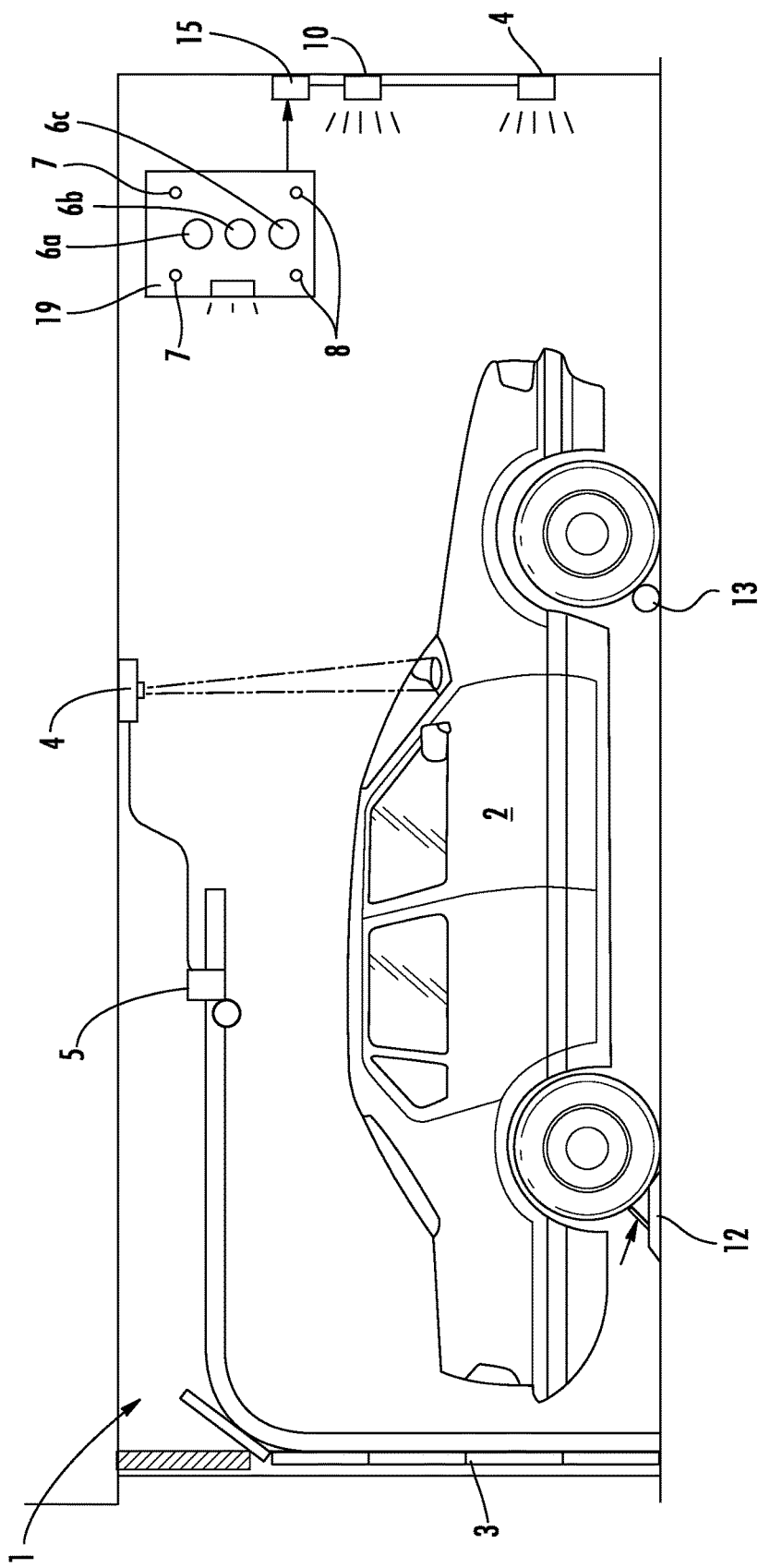
FIG. 1 is a side view of the system and method with the garage door closed.

While this invention is susceptible to embodiment in many different forms, there is shown in the drawings, and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "alerting a driver" refers to letting the driver of a vehicle that is exiting a garage know that the garage door is not open sufficiently to prevent the vehicle from hitting the garage door as the vehicle exits. It assumes an automatic door opener that can be tracked electronically. Alerting can be done by any means that contacts the driver, such as visually by light or message, through sound like a buzzer or alarm, or tactile means such as vibration or the like. The source of the alert can be located anywhere in the garage or in the vehicle itself and information transmitted wirelessly e.g. Bluetooth® wireless communication or similar system. In one embodiment, the alarm works through the vehicle's Global Positioning System (GPS).

As used herein, the term "vehicle" refers to a motorized vehicle that would typically be parked in a garage, e.g. a home garage. Examples include: automobiles, trucks, motorhomes, motorcycles, SUVs, lawnmowers, commercial vehicles and the like.

As used herein, the term "garage" refers to a building enclosure that is designed and shaped to enclose a vehicle. The garage will have an electrically operated garage door, with means for opening the garage door from the inside of the vehicle.

As used herein, the term "not sufficiently open" refers to, upon opening of the garage door electronically, if the door has sufficiently opened such that when the vehicle exits the garage it will not hit the garage door. In one embodiment, it is open enough for the vehicle to clear the door, even it's not open all the way and, in yet another embodiment, it means open all the way. The sensors in one embodiment can determine the height of the vehicle as it enters or otherwise (e.g. manually enter height into the microcontroller) and only warn of an exit issue if the door is less than that height. In another embodiment, a switch detects an open position and the door is deemed sufficiently open if it trips the switch.

As used herein, the term "exit" refers to the vehicle leaving the garage, either forward or backwards through the open garage door.

As used herein, the term "parking" refers to the position in the garage in which the vehicle is turned off and exited. Parking assistance and the like refers to electronic assistance in determining the position of the vehicle so that the driver will know when the vehicle is in the proper place for parking. In one embodiment, there is parking detection for indicating when the driver is properly parked when moving the vehicle into the garage. The same detectors and alarms can be used to indicate when the driver is in the proper parking position. In one embodiment shown in the figures, there are three lights which indicate the vehicle is parked properly, closest to parked properly, and not parked properly. The sound alarm and/or visual alarm and/or tactile alarm could also be utilized to indicate proper parking, As used herein, the term "electronic sensor for determining when the vehicle is moving" refers to one or more sensors placed in the garage to determine the movement or position of the vehicle towards the garage door. In one embodiment, sensors also include those used to determine parking position, so sensors can be utilized to aid in parking of the vehicle. They can either detect positions and compare them or directly monitor movement electronically. In one embodiment, it is an infrared or ultrasonic sensor, but any electronic sensor capable of being controlled by the microcontroller is contemplated. In one embodiment, it is a roll-over sensor. Sensors for deterring position of an object are well-known and can determine movement, position changes, or the like. They include detection by radar, laser light sensor, optical, microwave, infrared, or any other means for determining position As used herein, the term "electronic sensor for determining if the garage door is sufficiently open" refers to an electronic device such as an ultrasonic or infrared sensor or the like which determines if the door is open and/or how far open. The door position can be sensed by any convenient means, such as by a simple mechanical switch which the door hits upon reaching a certain level of opening. Door position could be detected by radar, laser light sensor, optical, microwave, infrared, or any other means for determining if the position of the door is open or closed or in-between. In one embodiment, the height of the vehicle is measured and that height used to determine when the garage door is sufficiently open. In another embodiment, the user can enter a height that, when reached by the garage door, is held to be sufficiently open. In one embodiment, if the car is moving toward an insufficiently open garage door the alarm sounds, and in yet another embodiment a distance from the garage door can be set before the alarm is sounded, even though the vehicle is moving.

As used herein, the term "alarm" refers to a device which alerts the driver when the door is not sufficiently open, a circuit in the system can coordinate the other sensors and then determine an alarm is to be set off when the condition of the vehicle moving toward the garage door occurs along with the door not sufficiently open. They can be audio like a siren or bell, visual like lights, or tactile like a vibration, or the like.

As used herein, the term "motion deterrent device" refers to a device which stops or slows the vehicles movement towards the garage door if the door is not sufficiently open. In one embodiment, a pop-up wheel chock is utilized (as shown in the Figures). The wheel chock can be solenoid driven to pop up when the door is not open sufficiently. In another embodiment, a device within the vehicle automatically applies the brakes of the car when the door is not open. Such braking devices are utilized in vehicles to prevent front end collisions and can easily be adapted to work with the system of the present invention e.g. integrated into the microcontroller and wirelessly send a message to the vehicle to brake.

Figure 3:
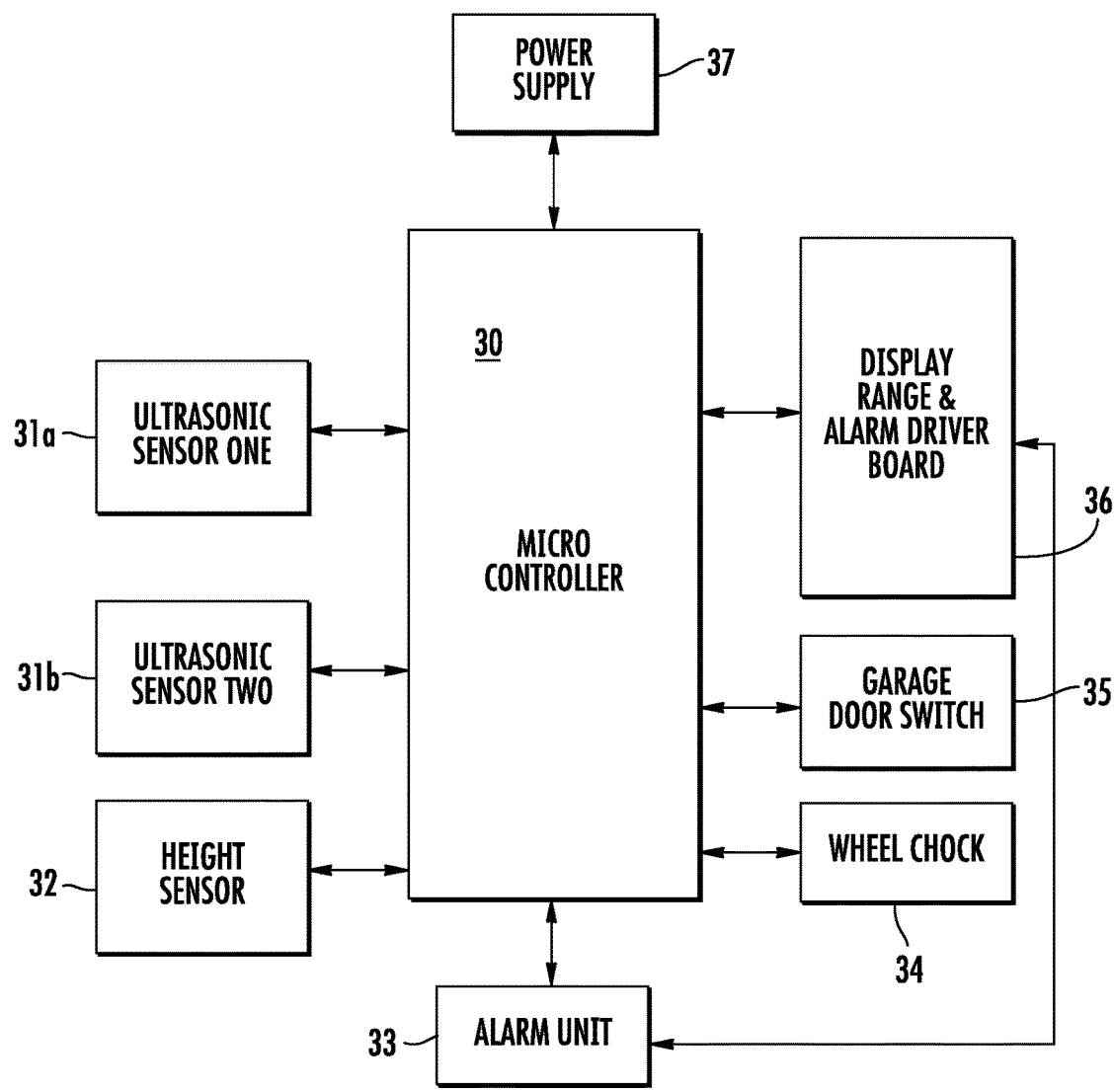
FIG. 3 is a microprocessor relationship diagram.

As used herein, the term "microcontroller" refers to a simple computer present in a single integrated circuit which is dedicated to perform one task and execute one specific application. It contains memory, programmable input/output peripherals, as well a processor. The electronic devices of the present system are all controlled by the microprocessor as shown in FIG. 3. The microcontroller is also, in one embodiment, programmable to set optimal distances, stop location, and the like. Power for each of the electronic devices can be supplied independently or powered through the microprocessor, as shown in the Figures, as desired.

In utilization of the method of the present invention, a driver would use the device in the standard method for parking the car in the garage. Upon leaving the garage, the engaged system would determine if the car is exiting, and the position of the door. An alarm would sound if the door is not sufficiently open, as discussed above, and optionally engage a motion deterrent device. In one embodiment, sensing that the vehicle is exiting could engage an optional device which starts opening the garage door when the door is not yet open or in the process of opening. This would relieve the driver of having to actuate the garage door.

DRAWINGS

Now referring to the drawings, FIG. 1 is a side perspective view of the system of the invention. Garage 1 houses vehicle 2. In this view, garage door 3 is all the way down in the closed position. Position sensors 4 on the top and front of the garage 1 determine that the vehicle 2 is parked properly. A switch 5 is triggered when door 3 is opened all the way and physically hits switch 5. Visual indicator lights 6a, 6b and 6c on alarm/microcontroller 15 indicate if the vehicle is in the parked position, close to it, or not at all close to the parked position. Smaller top lights 7 light up if the vehicle moves into an alarm zone where potential accidents can occur, while lower small lights 8 light up when the door is open. Visual light indicator 10 lights up when door is not open all the way. An automatic pop-up wheel chock 12 is shown, and roll over sensor 13 can also be utilized to determine if the vehicle is moving backwards. In this view, the microcontroller is in device 19.

Figure 2:
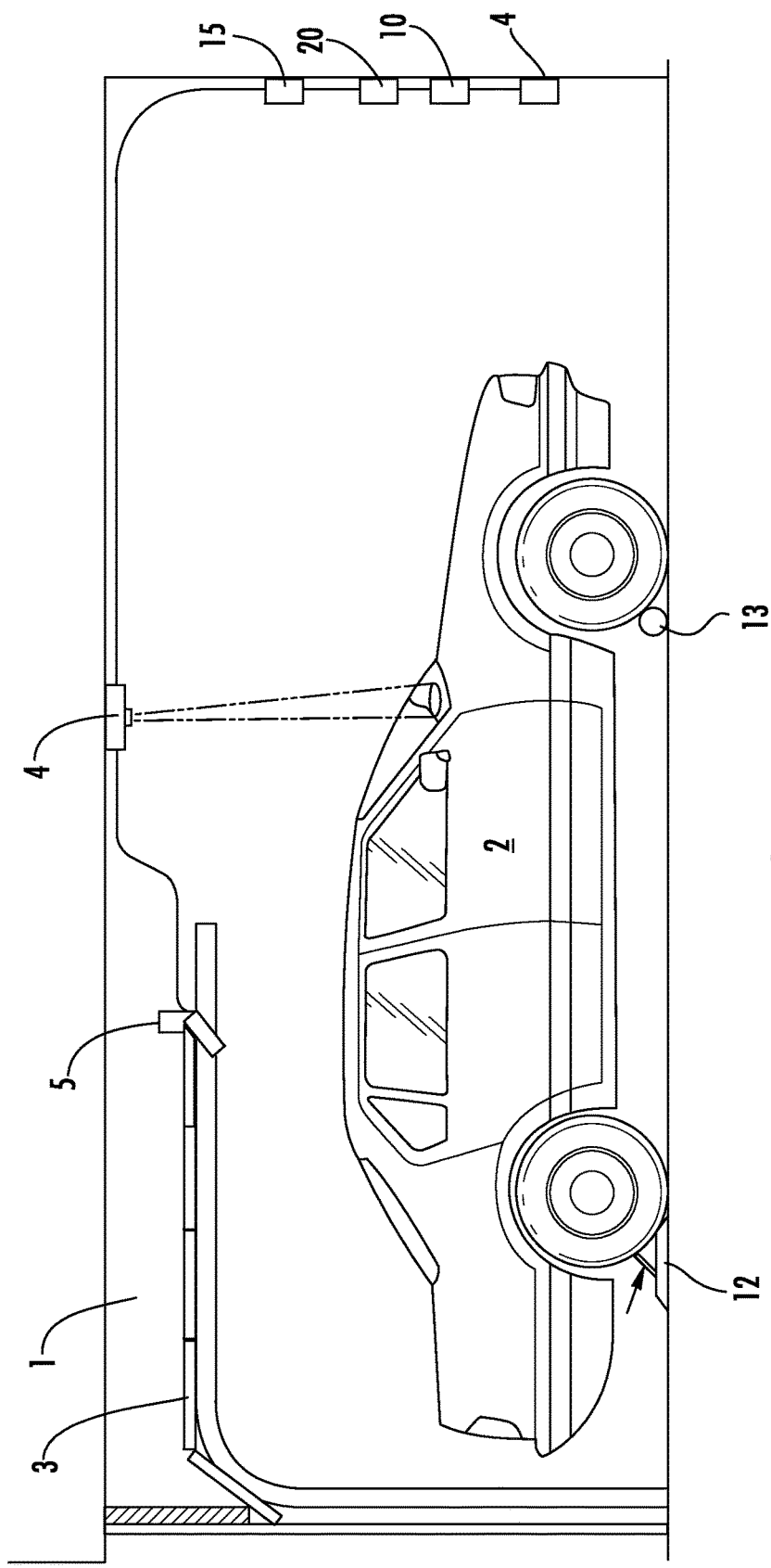
FIG. 2 is a side view of the system and method with the garage door open.

FIG. 2 is a side perspective of the car beginning to exit with the door 3 open/opening. In this view, the door 3 initially was not open sufficiently, and pop-up wheel chock 12 has popped up and is blocking the car's 2 exit and is about to drop back down as garage door 3 hits switch 5. The movement of vehicle 2 is detected by roll over 13 or one of the detectors 4. In this view, the alarm will sound and lights will flash as well, indicating the door 3 not quite open. Detector 20 also is positioned to measure the height of the vehicle so, if the user wants to, the alarm will not sound once the door 3 clears the actual height of the vehicle 2.

FIG. 3 is a relationship chart showing the relationship of the various devices of the invention controlled by a microcontroller. In this view, microcontroller 30 has ultrasonic detectors 31a and 31b, height sensor 32, alarm unit 33, wheel chock engagement 34, garage door switch 35, display range and alarm driver board 36, as well as power supply (AC or DC) 37. Programming the microcontroller 30 allows the functions as described herein.

Figure 4:
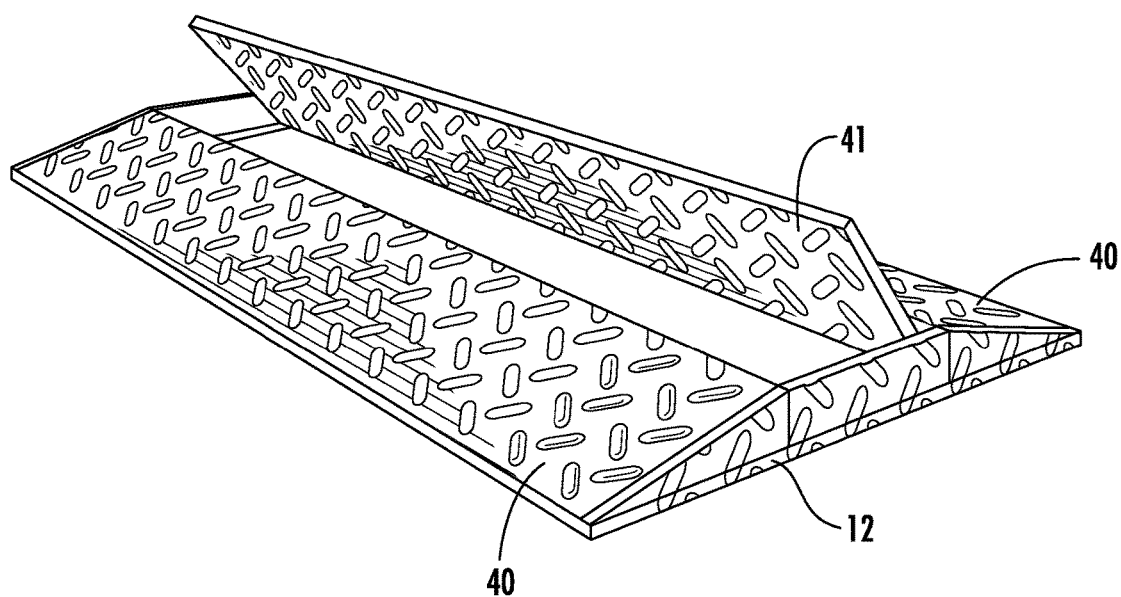
FIG. 4 is a perspective view of the automatic wheel chock.

FIG. 4 is a perspective view of a wheel chock in the up position. Wheel chock 12 has ramp portion 40 for rolling over device 12 when stop 41 is in the up position as shown blocking vehicle tire from moving past the device 12.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A garage positioned system for alerting a driver of a vehicle exiting the garage that a garage door is not sufficiently open to allow exit of the vehicle comprising:
   a) an electronic first sensor positioned in the garage and not in the car for determining only when the vehicle is moving toward the garage door;
   b) an electronic second sensor connected to the first sensor and positioned in the garage and not in the car for determining if the garage door is sufficiently open for the vehicle to exit without hitting the garage door; and
   c) an alarm to notify the vehicle's driver when the garage door is insufficiently open to allow for the vehicle to exit.

2. A system according to claim 1 wherein the garage door trips a switch in the garage when the garage door is sufficiently open to allow the vehicle to exit and gives notice to the vehicle.

3. A system according to claim 1 wherein the electronic device for determining when the vehicle is moving is an electronic position sensor.

4. A system according to claim 1 wherein the electronic device for determining when the vehicle is moving is a floor roll over sensor on the garage floor positioned to indicate when there is a vehicle is moving toward the garage door.

5. A system according to claim 1 wherein the alarm is selected from the group consisting of one or more of a visual alarm and an audio alarm.

6. A system according to claim 1 wherein the alarm is positioned in the vehicle.

7. A system according to claim 1 which further comprises a device positioned in the garage for determining vehicle position in the garage during parking the vehicle.

8. A system according to claim 1 which further comprises a vehicle motion deterring device, which is automatically activated to stop the vehicle if the door is insufficiently open.

9. A system according to claim 8 wherein the motion deterring device is a pop-up wheel chock.

10. A system according to claim 8 wherein the motion deterring device is a device in the vehicle which automatically applies brakes of the vehicle.

11. A system according to claim 1 for alerting a driver of a vehicle exiting a garage that a garage door is not sufficiently open to allow exit of the vehicle which further comprises a microcontroller to control the operation of the sensors and alarm.

12. A method for notifying a driver of a vehicle exiting a garage that a garage door is not sufficiently open to allow the vehicle to exit without hitting the garage door comprising:
   a) positioning a first sensor in the garage and not in the car which senses if the vehicle is moving toward the garage door;
   b) positioning a second sensor in the garage which senses if the garage door is sufficiently open for the vehicle to exit the garage without hitting the garage door; and
   c) initiating an alarm to warn the vehicle's driver when the garage door is not sufficiently open for the vehicle to not hit the door when the driver is moving the vehicle toward the garage door.

13. A method according to claim 12 wherein an audible alarm sounds when the alarm is initiated.

14. A method according to claim 12 wherein a visible alarm is flashed when the alarm is initiated.

15. A method according to claim 12 wherein a motion deterrent device is activated when the alarm is initiated.

16. The method according to claim 15 wherein the motion deterrent device is a pop-up wheel chock positioned outside the vehicle in a position to stop the vehicle from moving toward the garage door.

17. A method according to claim 15 wherein the motion deterrent device is a device which automatically applies brakes of the vehicle to stop the vehicle.

18. The method according to claim 12 which further comprises sensing when the vehicle is properly parked in a desired position in the garage.

* * * * *

UNITED STATES PATENT AND TRADEMARK OFFICE
CERTIFICATE OF CORRECTION

PATENT NO. : 9,937,906 B1
APPLICATION NO. : 15/349557
DATED : April 10, 2018
INVENTOR(S) : Thomas J. Stell and Aaron C Stell Page 1 of 1

It is certified that error appears in the above-identified patent and that said Letters Patent is hereby corrected as shown below:

On the Title Page

Items (71) and (72):
Error was:
Applicants: Thomas J. Stell, Rockwell City, IA (US); Aaron C Stell, Knightdale, NV (US)
Inventors: Thomas J. Stell, Rockwell City, IA (US); Aaron C Stell, Knightdale, NV (US)
Correction is:
Applicants: Thomas J. Stell, Rockwell City, IA (US); Aaron C Stell, Knightdale, NC (US)
Inventors: Thomas J. Stell, Rockwell City, IA (US); Aaron C Stell, Knightdale, NC (US)

Signed and Sealed this
Twenty-ninth Day of May, 2018

Andrei Iancu
*Director of the United States Patent and Trademark Office*